United States Patent
Mou et al.

(10) Patent No.: US 12,418,589 B2
(45) Date of Patent: Sep. 16, 2025

(54) CONTROL METHOD, CONTROL APPARATUS AND CLOUD-BASED CONTROL SYSTEM

(71) Applicant: GREE ELECTRIC APPLIANCES, INC. OF ZHUHAI, Guangdong (CN)

(72) Inventors: Guixian Mou, Guangdong (CN); Qinxin Lin, Guangdong (CN); Zongyan Chen, Guangdong (CN); Bin Wu, Guangdong (CN); Yimou Sun, Guangdong (CN); Wenbiao Wen, Guangdong (CN); Jinnan Zhou, Guangdong (CN); Liyun Wan, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 310 days.

(21) Appl. No.: 17/928,758

(22) PCT Filed: Mar. 9, 2021

(86) PCT No.: PCT/CN2021/079707
§ 371 (c)(1),
(2) Date: Nov. 30, 2022

(87) PCT Pub. No.: WO2021/258777
PCT Pub. Date: Dec. 30, 2021

(65) Prior Publication Data
US 2023/0231919 A1    Jul. 20, 2023

(30) Foreign Application Priority Data
Jun. 24, 2020   (CN) .......................... 202010584695.8

(51) Int. Cl.
*H04W 4/02*      (2018.01)
*G05B 15/02*    (2006.01)
(Continued)

(52) U.S. Cl.
CPC ............ *H04L 67/125* (2013.01); *G05B 15/02* (2013.01); *H04L 12/2816* (2013.01);
(Continued)

(58) Field of Classification Search
USPC ........................................................ 700/275
See application file for complete search history.

(56) References Cited

U.S. PATENT DOCUMENTS 7,631,186 B2    12/2009 Okabe
10,943,470 B2 *  3/2021 Lee ..................... H04L 12/2818
(Continued)

FOREIGN PATENT DOCUMENTS

CN    102281251 A    12/2011
CN    102811416 A    12/2012
(Continued)

OTHER PUBLICATIONS

International Search Report and Written Opinion in International Appln. No. PCT/CN2021/079707, mailed on Jun. 8, 2021, 13 pages (with English translation).

*Primary Examiner* — Emilio J Saavedra
(74) *Attorney, Agent, or Firm* — Fish & Richardson P.C.

(57) ABSTRACT

The disclosure provides a control method, a control apparatus and a cloud-based control system, and belongs to the technical field of cloud-based control. The control method includes: receiving first identification information sent by a client, wherein the first identification information comprises a first identifier and first position information of a device to be controlled; verifying whether the first identifier corresponds to the first position information; if the first identifier corresponds to the first position information, sending a verification requirement to the client, wherein the verification requirement is used for requesting a user to control the device to be controlled at a position of the device to be (Continued)

controlled; receiving a control instruction for the device to be controlled sent by a current control device; determining, according to the verification requirement and the control instruction, whether the client has control permission to the device to be controlled; if the client has the control permission, receiving a remote control instruction sent by the client, and controlling the device to be controlled through the current control device.

13 Claims, 3 Drawing Sheets

(51) Int. Cl.
*H04L 9/40* (2022.01)
*H04L 12/28* (2006.01)
*H04L 67/125* (2022.01)
*H04W 12/08* (2021.01)

(52) U.S. Cl.
CPC ............ *H04L 63/107* (2013.01); *H04W 4/02* (2013.01); *H04W 12/08* (2013.01); *G05B 2219/2642* (2013.01); *G08C 2201/91* (2013.01)

(56) References Cited

U.S. PATENT DOCUMENTS

| | | | |
|---|---|---|---|
| 2007/0024125 | A1 | 2/2007 | Biskup, Sr. et al. |
| 2007/0104168 | A1* | 5/2007 | Polson .................. H04W 24/04 370/338 |
| 2011/0287757 | A1 | 11/2011 | Nykoluk et al. |
| 2012/0226768 | A1* | 9/2012 | Gaines .................. G16H 40/67 709/217 |
| 2019/0342112 | A1* | 11/2019 | Li ........................... G06Q 50/12 |
| 2022/0050439 | A1* | 2/2022 | Maruyama ............... H04Q 9/00 |

FOREIGN PATENT DOCUMENTS

| | | |
|---|---|---|
| CN | 103560891 A | 2/2014 |
| CN | 103581201 A | 2/2014 |
| CN | 103954014 A | 7/2014 |
| CN | 104205143 A | 12/2014 |
| CN | 105376257 A | 3/2016 |
| CN | 105426938 A | 3/2016 |
| CN | 105450487 A | 3/2016 |
| CN | 105490925 A | 4/2016 |
| CN | 105743931 A | 7/2016 |
| CN | 106161385 A | 11/2016 |
| CN | 106557678 A | 4/2017 |
| CN | 107120791 A | 9/2017 |
| CN | 107154884 A | 9/2017 |
| CN | 107302593 A | 10/2017 |
| CN | 107388500 A | 11/2017 |
| CN | 107421060 A | 12/2017 |
| CN | 107566479 A | 1/2018 |
| CN | 108107743 A | 6/2018 |
| CN | 108566624 A | 9/2018 |
| CN | 109067881 A | 12/2018 |
| CN | 109116745 A | 1/2019 |
| CN | 109210734 A | 1/2019 |
| CN | 110677410 A | 1/2020 |
| CN | 110798471 A | 2/2020 |
| CN | 111750493 A | 10/2020 |
| EP | 2469855 A1 | 6/2012 |
| JP | 2000040064 A | 2/2000 |
| JP | 2003078593 A | 3/2003 |
| JP | 2005159495 A | 6/2005 |
| JP | 2007020988 A | 2/2007 |
| JP | 2007279844 A | 10/2007 |
| JP | 2011250027 A | 12/2011 |
| JP | 2015014406 A | 1/2015 |
| JP | 2017150701 A | 8/2017 |
| JP | 6560634 B2 | 8/2019 |
| KR | 20020061264 A | 7/2002 |
| KR | 20160047438 A | 5/2016 |
| WO | WO2013152247 A1 | 10/2013 |

* cited by examiner

CONTROL METHOD, CONTROL APPARATUS AND CLOUD-BASED CONTROL SYSTEM

CROSS-REFERENCE TO RELATED APPLICATIONS

This application is a U.S. National Phase application under 35 U.S.C. § 371 of International Patent Application No. PCT/CN2021/079707, filed on Mar. 9, 2021, which claims priority to Chinese Application No. 202010584695.8 filed on Jun. 24, 2020, the disclosure of which is hereby incorporated by reference in its entirety.

TECHNICAL FIELD

The disclosure relates to a control method, a control apparatus and a cloud-based control system.

BACKGROUND

With the development of the era of Internet of Things (IoT) and big data, the traditional industrial era has taken a big step closer to the era of IoT, and the concept of Internet of Everything is deeply rooted in people's hearts, including the air conditioning and refrigeration industry. People enjoy the comfortable experience of warm winter and cool summer brought by air conditioners, and now they are pursuing the humanization, convenience and intelligence of their services. For example, if one finds, after going for traveling, that the air conditioner at home is not turned off, he/she can remotely control the air conditioner to be turned off; or one can start the air conditioner in advance on his/her way home, so that the most comfortable indoor temperature can be achieved when he/she arrives home.

SUMMARY

According to an aspect of the embodiments of the disclosure, there is provided a control method that includes: receiving first identification information sent by a client, wherein the first identification information comprises a first identifier and first position information of a device to be controlled; verifying whether the first identifier corresponds to the first position information; if the first identifier corresponds to the first position information, sending a verification requirement to the client, wherein the verification requirement is used for requesting a user to control the device to be controlled at a position of the device to be controlled; receiving a control instruction for the device to be controlled sent by a current control device; determining, according to the verification requirement and the control instruction, whether the client has control permission to the device to be controlled; if the client has the control permission, receiving a remote control instruction sent by the client, and controlling the device to be controlled through the current control device.

In some embodiments, the method further includes: receiving second identification information uploaded by each of multiple devices to be controlled through the current control device, wherein the second identification information comprises a second identifier and second position information of each device to be controlled; and storing the second identifier and the second position information of each device to be controlled as a group of information.

In some embodiments, the verifying whether the first identifier corresponds to the first position information includes: querying whether stored second identification information contains a group of information of which the second identifier is identical to the first identifier and the second position information is identical to the first position information; if the stored second identification information contains the group of information, the first identifier corresponds to the first position information; if the stored second identification information does not contain the group of information, the first identifier does not correspond to the first position information.

In some embodiments, the determining, according to the verification requirement and the control instruction, whether the client has control permission to the device to be controlled includes: determining whether the control instruction meets the verification requirement; if the control instruction meets the verification requirement, the client has the control permission to the device to be controlled; if the control instruction does not meet the verification requirement, the client does not have the control permission to the device to be controlled.

In some embodiments, the method further includes: determining the current control device from among multiple control devices; receiving, through the current control device, a remote control instruction sent by a cloud; and controlling the device to be controlled according to the remote control instruction.

In some embodiments, the multiple control devices include a wireless control device and a wired control device, and the determining the current control device from among multiple control devices includes: if only communication information of the wireless control device can be received, determining the wireless control device as the current control device; or, if only communication information of the wired control device can be received, determining the wired control device as the current control device; or, if the communication information of the wireless control device and the wired control device is received, determining the wired control device as the current control device, and sending a sleep instruction to the wireless control device, wherein the sleep instruction is used for triggering the wireless control device to enter a sleep state; or, if the wireless control device is in the sleep state and abnormal information of the wired information is received, sending an activation instruction to the wireless control device, wherein the activation instruction is used for triggering the wireless control device to enter an operation state so as to switch the current control device as the wireless control device.

In some embodiments, the wired control device is a wired gateway.

In some embodiments, the wireless control device is a Data Transmission Unit (DTU).

In some embodiments, the wired control device is a wired gateway, and the wireless control device is a DTU.

In some embodiments, the verification requirement includes performing multiple times of control on the device to be controlled.

In some embodiments, the verification requirement includes an execution sequence of the multiple times of control.

In some embodiments, the device to be controlled is an air conditioning device.

According to another aspect of the embodiments of the disclosure, there is provided a control apparatus that includes: a client information receiving module configured to receive first identification information sent by a client, wherein the first identification information comprises a first identifier and first position information of a device to be controlled; a verification module configured to verify whether the first identifier corresponds to the first position information; a verification requirement receiving module configured to: if the first identifier corresponds to the first position information, send a verification requirement to the client, wherein the verification requirement is used for requesting a user to control the device to be controlled at a position of the device to be controlled; a current control device data receiving module configured to receive a control instruction for the device to be controlled sent by a current control device; a control permission determining module configured to determine, according to the verification requirement and the control instruction, whether the client has control permission to the device to be controlled; and a remote control module configured to: if the client has the control permission, receive a remote control instruction sent by the client, and control the device to be controlled through the current control device.

According to yet another aspect of the embodiments of the disclosure, there is provided a control apparatus that includes: a memory; and a processor coupled to the memory, configured to perform the method according to any one of the above embodiments based on instructions stored in the memory.

According to still another aspect of the embodiments of the disclosure, there is provided a cloud-based control system, including: the control apparatus according to any one of the above embodiments; the current control device configured to perform data interaction with the control apparatus, and control the device to be controlled; the device to be controlled configured to accept control from the current control device; and the client configured to interact with the control apparatus.

According to further another aspect of the embodiments of the disclosure, there is provided a computer-readable storage medium having stored thereon computer program instructions that, when executed by a processor, cause the processor to perform the method according to any one of the above embodiments.

BRIEF DESCRIPTION OF DRAWINGS

In order to more clearly explain the technical solutions in the embodiments of the disclosure, the drawings required to be used in the technical description of the embodiments will be briefly described below, and it will be apparent that the drawings described below are only some embodiments of the disclosure, from which other drawings may be obtained without creative efforts by those of ordinary skill in the art.

DETAILED DESCRIPTION

To make the purpose, technical solutions and advantages of the disclosure more clearly, the technical solutions of the disclosure will be described in detail below with reference to the accompanying drawings and the embodiments. It will be apparent that the described embodiments are only part of and not all of the embodiments of the disclosure. Based on the embodiments of the disclosure, all other embodiments obtained by those of ordinary skill in the art without making creative efforts fall within the scope of protection of the disclosure.

In a scheme known to the inventors, remote control of an air-conditioning unit is limited to be performed a local area network. An application (APP) program of a mobile terminal searches for a surrounding infrared device through Bluetooth, and then performs linkage control of a central air conditioner connected with the infrared device.

The inventors realize that the scheme is limited by the Bluetooth connection to the infrared device, and once the Bluetooth connection or the infrared device fails, the air conditioning unit cannot be remotely controlled. Thus, the remote control provided by the scheme is unstable. In addition, as long as someone knows the login information of the APP, he/she can control the air-conditioning unit, which cannot guarantee the privacy of users. Thus, the air-conditioning unit cannot be controlled safely.

Figure 1:
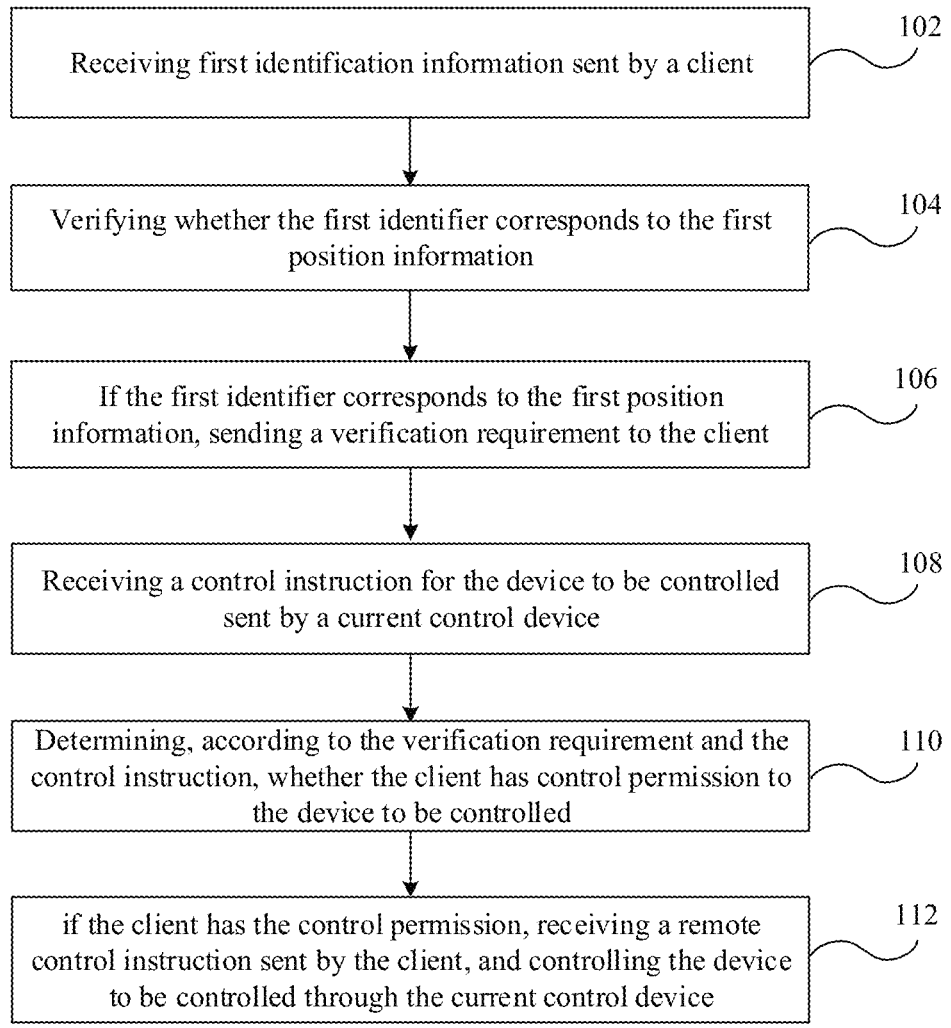
FIG. 1 is a flow chart of a control method provided according to some embodiments of the disclosure.

In some embodiments of the disclosure, there is provided a control method that includes steps 102 to 112 as shown in FIG. 1.

In step 102, first identification information sent by a client is received, where the first identification information includes a first identifier and first position information of a device to be controlled.

In step 104, it is verified whether the first identifier corresponds to the first position information.

In step 106, if the first identifier corresponds to the first position information, a verification requirement is sent to the client, where the verification requirement is used for requesting a user to control the device to be controlled at a position of the device to be controlled.

In step 108, a control instruction for the device to be controlled sent by a current control device is received.

In step 110, it is determined, according to the verification requirement and the control instruction, whether the client has control permission to a device to be controlled (i.e., the aforementioned device to be controlled) corresponding to the first identifier.

In step 112, if the client has the control permission, a remote control instruction sent by the client is received, and the device to be controlled is controlled through the current control device.

According to the control method provided according to the embodiments of the disclosure, after it is verified that the first identifier and the first position information input by a user through the client are correct, the verification requirement is sent to the user through the client, requesting a user to control the device to be controlled according to the verification requirement at a position of the device to be controlled. It is thus possible to ensure that the user inputting the first identifier and the position information can control the device to be control in a short range, and realize the accurate matching between the user and the air conditioning device. In this way, the user can remotely control the device to be controlled through the client, thus ensuring the privacy of the user and the safety in controlling the operation of the device to be controlled.

In some embodiments, the method further includes: second identification information uploaded by each of multiple devices to be controlled through the current control device is received, where the second identification information includes a second identifier and second position information of each device to be controlled; and the second identifier and the second position information of each device to be controlled are stored as a group of information.

In some embodiments, the step of verifying whether the first identifier corresponds to the first position information includes: it is queried whether stored second identification information contains a group of information of which the second identifier is identical to the first identifier and the second position information is identical to the first position information; if the stored second identification information contains the group of information, the first identifier corresponds to the first position information; if the stored second identification information does not contain the group of information, the first identifier does not correspond to the first position information.

According to some implementations of the embodiment of the present disclosure, the first identifier is a device bar code of the device to be controlled uploaded by the user through the client, and the first position information is an address of the position of the device to be controlled uploaded by the user through the client. The second identifier is a device bar code of a device to be controlled by the current control device, which is uploaded by the current control device, and the second position information is an address of the position of the device to be controlled by the current control device, which is uploaded by the current control device.

According to some implementations of the embodiment of the disclosure, the step of determining, according to the verification requirement and the control instruction, whether the client has control permission to the device to be controlled includes: it is determined whether the control instruction meets the verification requirement; if the control instruction meets the verification requirement, the client has the control permission to the device to be controlled; if the control instruction does not meet the verification requirement, the client does not have the control permission to the device to be controlled.

In some embodiments, the method further includes: the current control device is determined from among multiple control devices; a remote control instruction sent by a cloud is received through the current control device; and the device to be controlled is controlled according to the remote control instruction.

According to the control method provided by the embodiment of the disclosure, the remote control instruction sent by the user through the client is received after it is determined that the client has the corresponding control permission, and the remote control instruction is received after the current control device is determined, thus realizing cloud-based remote control, having various control modes and ensuring the stability of the remote control.

In some embodiments, the multiple control devices include a wireless control device and a wired control device, and the step that the current control device is determined from among multiple control devices includes:
if only communication information of the wireless control device can be received, the wireless control device is determined as the current control device; or,
if only communication information of the wired control device can be received, the wired control device is determined as the current control device; or,
if the communication information of the wireless control device and the wired control device is received, the wired control device is determined as the current control device, and a sleep instruction is sent to the wireless control device, where the sleep instruction is used for triggering the wireless control device to enter a sleep state; or,
if the wireless control device is in the sleep state and abnormal information of the wired information is received, an activation instruction is sent to the wireless control device, where the activation instruction is used for triggering the wireless control device to enter an operation state so as to switch the current control device as the wireless control device.

Firstly, it is determined which control device to use according to user conditions, that is, if the user can only use one of the wireless control device or the wired control device, only the control device that the user can use is finally used. If the user has a good condition is good that both wired control device and wireless control device can be used, the wired control device is preferentially used, and the wireless control device is controlled to enter the sleep state in this case. If the wired control device cannot connect to the cloud to obtain remote the control instruction when the wireless control device is in the sleep state, the wireless control device is activated, thereby achieving the switching between the wired control device and the wireless control device. If it is detected that the wired control device can be reconnected to the cloud, when the wireless control device does not interact with the cloud, the wired control device is switched back to connect with the cloud for data interaction.

According to some implementations of the embodiment of the disclosure, the wired control device is a wired gateway. According to some implementations of the embodiment of the disclosure, the wireless control device is a Data Transmission Unit (DTU). According to some implementations of the embodiment of the disclosure, the wired control device is a wired gateway, and the wireless control device is a DTU. According to some implementations of the embodiment of the disclosure, the device to be controlled is an air conditioning device.

It should be noted that the DTU is a wireless communication module, which can obtain communication bus data of the control system, transmit data through a 2G or 4G cellular network, and perform data interaction with the cloud. The wired gateway builds local access services in an LAN, and the local access services implement wired access services between the gateway and the cloud for data interaction, thus realizing the control of the air-conditioning device. When the user has both a wired controller and a wireless controller, the wired controller and the wireless controller perform handshake interaction on a communication bus of the air conditioner; and when the two types of controllers confirm that they have received the handshake signal from their respective opposite parties, the wireless controller enters a sleep state (wireless communication is based on cellular communication, and the network signal is generally weaker than the signal of the wired network), and the wired controller is preferentially used for cloud-based transmission of data and control related operations of the air conditioner. However, when the wired controller detects an abnormality with the cloud network (including but not limited to: network abnormality, such as network disconnection), it sends an abnormal communication instruction to the communication bus of the air conditioner to trigger the wireless controller to enter the working state, thus realizing the working switch between the wired and wireless controllers.

Figure 2:
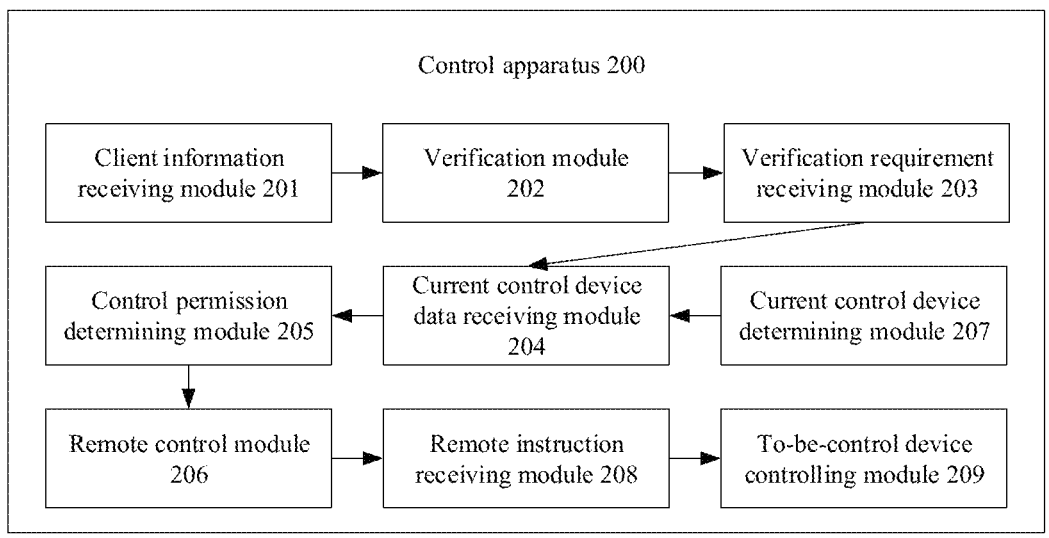
FIG. 2 is a schematic structural diagram of a control apparatus provided according to some embodiments of the disclosure.

In some embodiments, the present disclosure also provides a control apparatus 200, as shown in FIG. 2, including a user information receiving module 201, a verification module 202, a verification requirement receiving module 203, a current control device data receiving module 204, a control permission determining module 205 and a remote control module 206.

The client information receiving module 201 is configured to receive first identification information sent by a client, where the first identification information includes a first identifier and first position information of a device to be controlled.

The verification module 202 is configured to verify whether the first identifier corresponds to the first position information.

The verification requirement receiving module 203 is configured to: if the first identifier corresponds to the first position information, send a verification requirement to the client, where the verification requirement is used for requesting a user to control the device to be controlled at a position of the device to be controlled.

In some embodiments, the verification requirement receiving module 203 is configured to query whether stored second identification information contains a group of information of which a second identifier is identical to the first identifier and a second position information is identical to the first position information; and if the stored second identification information contains the group of information, the first identifier corresponds to the first position information; if the stored second identification information does not contain the group of information, the first identifier does not correspond to the first position information.

The current control device data receiving module 204 is configured to receive a control instruction for the device to be controlled sent by a current control device.

In some embodiments, the current control device data receiving module 204 is configured to: receive second identification information uploaded by each device to be controlled through the current control device, the second identification information including a second identifier and second position information of each device to be controlled; and store the second identifier and the second position information of each device to be controlled as the group of information.

The control permission determining module 205 is configured to determine, according to the verification requirement and the control instruction, whether the client has control permission to the device to be controlled.

In some embodiments, the control permission determining module 205 is configured to determine whether the control instruction meets the verification requirement; and if the control instruction meets the verification requirement, the client has the control permission to the device to be controlled; if the control instruction does not meet the verification requirement, the client does not have the control permission to the device to be controlled.

In some embodiments, the device to be controlled is an air conditioning device installed at home. The verification requirement includes but is not limited to: requiring a user to turn on/off air-conditioning device at home; or controlling, at home, the air-conditioning device for heating/dehumidification/cooling; or controlling, at home, the heating/cooling temperature of the air-conditioning device to a specific value. It will be appreciated that in order to ensure the accuracy of the verification, in some embodiments, the verification requirement requires a user to perform multiple times of control on the device to be controlled. When the user's multiple times of control of the device to be controlled are completely the same as specified in the verification requirement, the client has the control permission to the device to be controlled; and as long as the control and the verification requirement are different at least once, the client does not have the control permission to the device to be controlled. In some embodiments, when the determination is made, it is also required that a control sequence of the controls made by the user is consistent with that specified in the verification requirement.

The remote control module 206 is configured to: if the client has the control permission, receive a remote control instruction sent by the client, and control the device to be controlled through the current control device.

In some embodiments, the control apparatus further includes a current control device determining module 207 configured to determine a current control device from among multiple control devices.

In some embodiment, if only communication information of the wireless control device can be received, the current control device determining module determines the wireless control device as the current control device; or, if only communication information of the wired control device can be received, the current control device determining module determines the wired control device as the current control device; or, if the communication information of the wireless control device and the wired control device is received, the current control device determining module determines the wired control device as the current control device, and sends a sleep instruction to the wireless control device, where the sleep instruction is used for triggering the wireless control device to enter a sleep state; or, if the wireless control device is in the sleep state and abnormal information of the wired information is received, the current control device determining module sends an activation instruction to the wireless control device, where the activation instruction is used for triggering the wireless control device to enter an operation state so as to switch the current control device as the wireless control device.

In some embodiments, the wired control device is a wired gateway and/or the wireless control device is a DTU.

In some embodiments the control apparatus further includes a remote instruction receiving module 208 and a to-be-controlled device controlling module 209. The remote instruction receiving module 208 is configured to receive, through the current control device, a remote control instruction sent by a cloud. The to-be-controlled device controlling module 209 is configured to control the device to be controlled according to the remote control instruction.

In some embodiments, the device to be controlled in the embodiments of the disclosure is an air conditioning device installed at home.

According to the control apparatus provided by the embodiment of the disclosure, the client information receiving module receives first identification information sent by a client; the verification module verifies whether the first identifier corresponds to the first position information; if the first identifier corresponds to the first position information, the verification requirement receiving module sends a verification requirement to the client; the current control device data receiving module receives a control instruction for the device to be controlled sent by a current control device; the control permission determining module determines, according to the verification requirement and the control instruction, whether the client has control permission to the device to be controlled; if the client has the control permission, the remote control module receives a remote control instruction sent by the client, and controls the device to be controlled through the current control device. The current control device determination module determines the current control device from among multiple control devices; the remote instruction receiving module receives, using the current control device, the remote control instruction sent by the cloud; and the to-be-controlled device controlling module controls the device to be controlled according to the remote control instruction. When there are multiple control devices, the final control device is determined to ensure the stable control of the device to be controlled. After receiving the first identifier and the first position information, the control apparatus performs verification to check whether the first identification information corresponds to the first position information; if the first identification information corresponds to the first position information, a verification requirement is sent to the client to request the user to operate the device to be controlled on the spot according to the verification requirement; and if the control of the device to be controlled on the spot meets the verification requirement, it is determined that the client has the control permission to the device to be controlled. It is thus possible to ensure the privacy of users and the control safety of device to be controlled.

Figure 3:
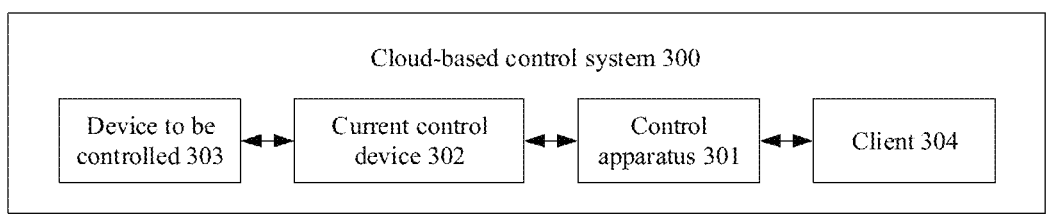
FIG. 3 is a schematic structural diagram of a cloud-based control system provided according to some embodiments of the disclosure.

In some embodiments, the disclosure further provides a cloud-based control system 300, as shown in FIG. 3, which includes:

the control apparatus 301 mentioned in any of the above embodiments, for example the control apparatus 200 shown in FIG. 2;

the current control device 302 configured to perform data interaction with the control apparatus 301, and control the device to be controlled;

the device to be controlled 303 configured to accept control from the current control device; and the client 304 configured to interact with the control apparatus.

Since the control apparatus has been described in detail in the above embodiments, it will not be elaborated again.

According to the cloud-based control system provided according to the embodiments of the disclosure, after it is verified that the first identifier and the first position information input by a user through the client are correct, the verification requirement is sent to the user through the client, requesting a user to control the device to be controlled according to the verification requirement at a position of the device to be controlled. It is thus possible to ensure that the user inputting the first identifier and the position information can control the device to be control in a short range, and realize the accurate matching between the user and the air conditioning device. In this way, the user can remotely control the device to be controlled through the client, thus ensuring the privacy of the user and the safety in controlling the operation of the device to be controlled. The remote control instruction sent by the user through the client is received after it is determined that the client has the corresponding control permission, and the remote control instruction is received after the current control device is determined, thus realizing cloud-based remote control, having various control modes and ensuring the stability of the remote control.

In order to more clearly explain the technical scheme of the disclosure, the disclosure further provides an embodiment of a cloud-based control system for remotely monitoring an air conditioner in user level based on big data. The control system includes a device layer, a control layer, a data access layer, a storage layer and a visualization layer. The device layer is a remotely monitored device; the control layer is used to control the device of the equipment layer; the data access layer is used to provide access services for data interaction between the control layer and the cloud. The storage layer is used to store data. The visualization layer is used to provide users with an operation interface, receive data from users and upload the data to the cloud.

Figure 4:
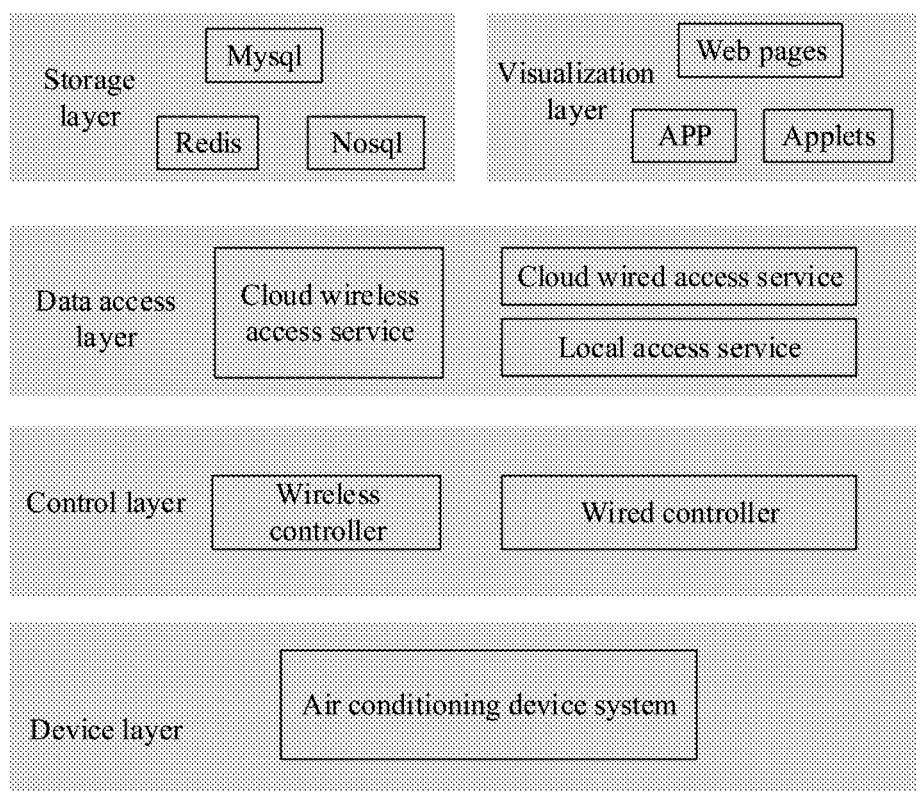
FIG. 4 is a schematic structural diagram of a cloud-based control system for remotely monitoring an air conditioner in user level based on big data provided according to some embodiments of the disclosure.

As shown in FIG. 4, in some embodiments, the device layer is an air conditioning device system; and the control layer includes a wireless controller and a wired controller. The data access layer includes a cloud-based wireless access service and a cloud-based wired access service, where the cloud-based wired access service accesses the cloud through a local access service. The storage layer includes Mysql, Redis, and Nosql. The visualization layer includes web pages, Apps and applets.

The control layer is mainly divided into two types of controllers. The wireless controller is mainly a DTU module, which has the function of performing data interaction with the cloud, sends data to the cloud and receives control instructions returned by the cloud to control the air-conditioning device. The wired controller is mainly a wired gateway, which builds access service to establish communication with the LAN, and the local access service performs data interaction with the cloud wired access service to realize the control of air-conditioning device. The storage layer mainly refers to various types of required databases. The visualization layer refers to a visual interface for establishing control interaction with users, such as web pages, mobile Apps, WeChat applets and the like.

Because all data of the air-conditioning system are connected to the cloud, users can control the air-conditioning units through the visualization layer. Due to the problem of the privacy of users, different users can only see their own air-conditioning units. Therefore, when users use the visualization layer to remotely control the units, the cloud needs to accurately match the users and the units. Preliminary matching is performed in the cloud based on barcode information and a geographical position of the unit, which are inputted by the user. After the preliminary matching, the user is prompted to perform corresponding operation instructions, thereby realizing accurate matching between the user and the cloud-based air-conditioning device.

In some embodiments of the disclosure, user-level cloud-based control of an air conditioning system is implemented through three ways. In a first way, the wireless controller, mainly a DTU or wireless communication module, obtains communication bus data of the control system, transmits data through a 2G or 4G cellular network, and performs data interaction with the cloud. In a second way, the wired gateway builds local access services in an LAN, and the local access services implement wired access services between the gateway and the cloud for data interaction, thus realizing the control of the air-conditioning device. In the third way, when the user has both a wired controller and a wireless controller, the wired controller and the wireless controller perform handshake interaction on a communication bus of the air conditioner; and when the two types of controllers confirm that they have received the handshake signal from their respective opposite parties, the wireless controller enters a sleep state (wireless communication is based on cellular communication, and the network signal is generally weaker than the signal of the wired network), and the wired controller is preferentially used for cloud-based transmission of data and control related operations of the air conditioner. However, when the wired controller detects an abnormality with the cloud network (including but not limited to: network abnormality, such as network disconnection), it sends an abnormal communication instruction to the communication bus of the air conditioner to trigger the wireless controller to enter the working state, thus realizing the working switch between the wired and wireless controllers.

The selection for the control layer has been completed through the above steps, and a communication mode between the control layer and the data access layer includes two modes depending on the different selections for the control layer. In a first mode, the wireless controller establishes a TCP connection with the cloud wireless access service, and the cloud wireless access service implements the data access of the unit and uploads the data of the air conditioning unit to the cloud server. In a second mode, the wired controller establishes communication with the access service deployed in the LAN through the network cable, and the LAN uploads data to the cloud server, thereby realizing uploading of data of the air conditioning unit to the cloud server. Through the connection established between the control layer and the data access layer, the data of the unit is uploaded to the cloud server; and the cloud server parses basic information of the unit and the geographical location information of the unit from the data of the unit, and stores them in the database.

Before using the visualization layer, the identity information of the user and the unit needs to be bonded, and the user only has the permission to view and monitor his/her own units. When the user applies for an account number for accurate binding with the unit, the binding process is as follows. Firstly, the user inputs the barcode of the unit and the position information of the unit, and the cloud server matches the barcode with the position information of the unit; if the matching is successful, proceeds to a secondary matching, in which the user is prompted to operate the unit on the spot at the position of the unit, such as switching the air-conditioning operation mode, setting the air-conditioning temperature, and starting and stopping the internal and external units of a specific air conditioner; if the operation of the user is consistent with the operation mode of the air-conditioning unit detected by the cloud, the accurate matching of the unit will be completed, and the user has the permission to remotely control the unit.

The embodiment of the disclosure provides a cloud-based control system for remotely monitoring an air conditioner in user level based on big data, which provides three data interaction modes implemented through the wired controller, the wireless controller as well as both the wired controller and wireless controller (transmission modes can be freely switched), so as to realize reporting of the data of the air-conditioner to the cloud. The multi-mode data interaction through the controllers realizes adaptive interaction of the data of the air conditioner with the cloud. The identification of massive amounts of device information in the cloud is realized by identification of device information and operation mode by the user, and the accurate control of the air conditioning system in the user-level cloud is realized.

It is to be understood that the same or similar parts of the above embodiments may be referenced to each other and contents not explained in detail in some embodiments may be referred to the same or similar contents in other embodiments.

It should be noted that in the description of the disclosure, the terms "first", "second" and the like are used for descriptive purposes only and cannot be understood as indicating or implying relative importance. In addition, in the description of the disclosure, the term "multiple" means at least two unless otherwise stated.

Any process or method description in the flowchart or otherwise described herein may be understood as, A module, fragment, or part of code representing one or more executable instructions for implementing steps of a particular logical function or process, And the scope of the preferred implementation of the disclosure includes additional implementations in which functions may be performed not in the order shown or discussed, including in a substantially simultaneous manner or in reverse order depending on the functions involved, as will be understood by those skilled in the art to which embodiments of the disclosure pertain.

It should be understood that portions of the disclosure may be implemented in hardware software firmware or a combination thereof. In the implementation described above, a plurality of steps or methods may be implemented with software or firmware stored in memory and executed by a suitable instruction execution system. For example, if implemented in hardware, As in another implementation, it may be implemented by any of the following techniques well known in the art, or a combination thereof: a discrete logic circuit having logic gates for performing logic functions on data signals, an application specific integrated circuit having suitable combinational logic gates, a programmable gate array (PGA), a field programmable gate array (FPGA), and the like.

Those of ordinary skill in the art will appreciate that all or part of the steps carried by the method of implementing the above embodiments can be performed by instructing the associated hardware through a program stored in a computer-readable storage medium, which program, when executed, includes one or a combination of the steps of the method embodiment.

In addition, each functional unit in each embodiment of the disclosure may be integrated in one processing module, each unit may exist physically alone, or two or more units may be integrated in one module. The above-mentioned integrated modules can be realized either in the form of hardware or in the form of software function modules. The integrated modules may also be stored in a computer readable storage medium if implemented in the form of software functional modules and sold or used as stand-alone products.

The above-mentioned storage medium may be a read-only memory, a magnetic disk or an optical disk, etc.

In the description of this specification, descriptions of the reference terms "one embodiment", "some embodiments", "example", "specific example", or "some examples", etc. mean that specific features, structures, materials, or features described in connection with the embodiment or example are included in at least one embodiment or example of the disclosure. In this specification schematic expressions of the above terms do not necessarily refer to the same embodiments or examples. Further the specific features structures materials or features described may be combined in any one or more embodiments or examples in a suitable manner.

Although the embodiments of the disclosure have been shown and described above, it is to be understood that the above-described embodiments are exemplary and cannot be construed as limiting, and that changes, modifications, substitutions and modifications may be made to the above-described embodiments by those of ordinary skill in the art within the scope of the disclosure.

The invention claimed is:

1. A control method, comprising:
receiving first identification information sent by a client, wherein the first identification information comprises a first identifier and first position information of a first device to be controlled;
receiving second identification information uploaded by each of multiple devices to be controlled through a current control device, wherein the second identification information comprises a second identifier and second position information of each of the multiple devices to be controlled;
storing the second identifier and the second position information of each of the multiple devices to be controlled as a respective group of information;
verifying whether the first identifier corresponds to the first position information, wherein the verifying whether the first identifier corresponds to the first position information comprises:
querying whether the second identification information contains a group of information of which the second identifier is identical to the first identifier and the second position information is identical to the first position information,
responsive to determining that the second identification information contains the group of information of which the second identifier is identical to the first identifier and the second position information is identical to the first position information, determining that the first identifier corresponds to the first position information, and
responsive to determining that the second identification information does not contain the group of information of which the second identifier is identical to the first identifier and the second position information is identical to the first position information, determining that the first identifier does not correspond to the first position information;
responsive to determining that the first identifier corresponds to the first position information, sending a verification requirement to the client, wherein the verification requirement is used for requesting a user to control the first device to be controlled at a position of the first device to be controlled;
receiving a control instruction for the first device to be controlled sent by the current control device;
determining, according to the verification requirement and the control instruction, whether the client has control permission to the first device to be controlled; and
response to determining that the client has the control permission, receiving a remote control instruction sent by the client, and controlling the first device to be controlled through the current control device.

2. The method according to claim 1, wherein the determining, according to the verification requirement and the control instruction, whether the client has control permission to the first device to be controlled comprises:
determining whether the control instruction meets the verification requirement;
responsive to determining that the control instruction meets the verification requirement, determining that the client has the control permission to the first device to be controlled; and
responsive to determining that the control instruction does not meet the verification requirement, determining that the client does not have the control permission to the first device to be controlled.

3. The method according to claim 1, further comprising:
determining the current control device from among multiple control devices;
receiving, through the current control device, a remote control instruction sent by a cloud; and
controlling the first device to be controlled according to the remote control instruction.

4. The method according to claim 3, wherein the multiple control devices comprise a wireless control device and a wired control device, and the determining the current control device from among multiple control devices comprises:
responsive to determining that only communication information of the wireless control device can be received, determining the wireless control device as the current control device;
responsive to determining that only communication information of the wired control device can be received, determining the wired control device as the current control device;
responsive to determining that the communication information of the wireless control device and the wired control device is received, determining the wired control device as the current control device, and sending a sleep instruction to the wireless control device, wherein the sleep instruction is used for triggering the wireless control device to enter a sleep state; or
responsive to determining that the wireless control device is in the sleep state and abnormal information of the wired information is received, sending an activation instruction to the wireless control device, wherein the activation instruction is used for triggering the wireless control device to enter an operation state so as to switch the current control device as the wireless control device.

5. The method of claim 4, wherein the wired control device is a wired gateway.

6. The method of claim 4, wherein the wireless control device is a Data Transmission Unit (DTU).

7. The method according to claim 4, wherein the wired control device is a wired gateway, and the wireless control device is a DTU.

8. The method according to claim 1, wherein the verification requirement comprises performing multiple times of control on the first device to be controlled.

9. The method according to claim 8, wherein the verification requirement comprises an execution sequence of the multiple times of control.

10. The method according to claim 1, wherein the first device to be controlled is an air conditioning device.

11. A control apparatus, comprising:
a memory storing processor-executable instructions; and
a processor configured to execute the stored processor-executable instructions to perform operations of:
receiving first identification information sent by a client, wherein the first identification information comprises a first identifier and first position information of a first device to be controlled;
receiving second identification information uploaded by each of multiple devices to be controlled through a current control device, wherein the second identification information comprises a second identifier and second position information of each of the multiple devices to be controlled;
storing the second identifier and the second position information of each of the multiple devices to be controlled as a respective group of information;
verifying whether the first identifier corresponds to the first position information, wherein the verifying whether the first identifier corresponds to the first position information comprises:
querying whether the second identification information contains a group of information of which the second identifier is identical to the first identifier and the second position information is identical to the first position information, responsive to determining that the second identification information contains the group of information of which the second identifier is identical to the first identifier and the second position information is identical to the first position information, determining that the first identifier corresponds to the first position information, and responsive to determining that the second identification information does not contain the group of information of which the second identifier is identical to the first identifier and the second position information is identical to the first position information, determining that the first identifier does not correspond to the first position information;

responsive to determining that the first identifier corresponds to the first position information, sending a verification requirement to the client, wherein the verification requirement is used for requesting a user to control the first device to be controlled at a position of the first device to be controlled;

receiving a control instruction for the first device to be controlled sent by the current control device;

determining, according to the verification requirement and the control instruction, whether the client has control permission to the first device to be controlled; and if the client has the control permission, receiving a remote control instruction sent by the client, and controlling the first device to be controlled through the current control device.

12. A cloud-based control system, comprising:
the control apparatus according to claim 11;
the current control device configured to perform data interaction with the control apparatus, and control the first device to be controlled;
the first device to be controlled configured to accept control from the current control device; and
the client configured to interact with the control apparatus.

13. A non-transitory computer-readable storage medium having stored thereon computer program instructions that, when executed by a processor, cause the processor to perform a control method, the method comprising:
receiving first identification information sent by a client, wherein the first identification information comprises a first identifier and first position information of a first device to be controlled;

receiving second identification information uploaded by each of multiple devices to be controlled through a current control device, wherein the second identification information comprises a second identifier and second position information of each of the multiple devices to be controlled;

storing the second identifier and the second position information of each of the multiple devices to be controlled as a respective group of information;

verifying whether the first identifier corresponds to the first position information, wherein the verifying whether the first identifier corresponds to the first position information comprises:
querying whether the second identification information contains a group of information of which the second identifier is identical to the first identifier and the second position information is identical to the first position information, responsive to determining that the second identification information contains the group of information of which the second identifier is identical to the first identifier and the second position information is identical to the first position information, determining that the first identifier corresponds to the first position information, and responsive to determining that the second identification information does not contain the group of information of which the second identifier is identical to the first identifier and the second position information is identical to the first position information, determining that the first identifier does not correspond to the first position information;

responsive to determining that the first identifier corresponds to the first position information, sending a verification requirement to the client, wherein the verification requirement is used for requesting a user to control the first device to be controlled at a position of the first device to be controlled;

receiving a control instruction for the device to be controlled sent by the current control device;

determining, according to the verification requirement and the control instruction, whether the client has control permission to the first device to be controlled; and if the client has the control permission, receiving a remote control instruction sent by the client, and controlling the first device to be controlled through the current control device.

* * * * *